US012596930B2

(12) United States Patent
Cho et al.

(10) Patent No.: US 12,596,930 B2
(45) Date of Patent: Apr. 7, 2026

(54) SENSOR COMPENSATION USING BACKPROPAGATION

(71) Applicant: International Business Machines Corporation, Armonk, NY (US)

(72) Inventors: Minsik Cho, Austin, TX (US); Inseok Hwang, Austin, TX (US); Chungkuk Yoo, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1117 days.

(21) Appl. No.: 17/358,725

(22) Filed: Jun. 25, 2021

(65) Prior Publication Data

US 2022/0414475 A1 Dec. 29, 2022

(51) Int. Cl.
G06N 3/084 (2023.01)
G06F 18/21 (2023.01)
(Continued)

(52) U.S. Cl.
CPC ........... G06N 3/084 (2013.01); G06F 18/214 (2023.01); G06F 18/217 (2023.01); G06N 3/045 (2023.01); G06V 10/751 (2022.01)

(58) Field of Classification Search
CPC ............................... G06N 3/084; G06N 3/045
See application file for complete search history.

(56) References Cited

U.S. PATENT DOCUMENTS 5,554,273 A 9/1996 Demmin et al.
11,836,160 B1 * 12/2023 Xia ........................ G06N 20/00
(Continued)

FOREIGN PATENT DOCUMENTS

| JP | 2021-028813 A | 2/2021 |
| JP | 2024-528426 A | 7/2024 |
| WO | 2022/268620 A1 | 12/2022 |

OTHER PUBLICATIONS

Hwang, Inhwan, "Multi-modal human action recognition using deep neural networks fusing image and inertial sensor data." (2017). (Year: 2017).*

(Continued)

*Primary Examiner* — Li B. Zhen
*Assistant Examiner* — Sadik A Alshahari
(74) *Attorney, Agent, or Firm* — Garg Law Firm, PLLC; Rakesh Garg; Teddi Maranzano

(57) ABSTRACT

An embodiment includes training a first convolutional neural network (CNN) using a plurality of training images to generate first and second trained CNNs, and then adding an interface layer to the second trained CNN. The embodiment processes a first and second images in a sequence of images using the first trained CNN to generate a first and second result vectors. The embodiment also processes the second image using the second trained CNN and sensor data input to the interface layer to generate a third result vector. The embodiment modifies the sensor data using a compensation value. The embodiment compares the third result vector to the second result vector to generate an error value, and then calculates a modified compensation value using the error value. The embodiment then generates a sensor-compensated trained CNN based on the second trained CNN with the modified compensation value.

18 Claims, 9 Drawing Sheets

(51) Int. Cl.
*G06F 18/214* (2023.01)
*G06N 3/045* (2023.01)
*G06V 10/75* (2022.01)

(56) References Cited

U.S. PATENT DOCUMENTS

| | | | |
|---|---|---|---|
| 2010/0023238 A1 | 1/2010 | Adibhatla | |
| 2017/0344879 A1* | 11/2017 | Merhav | G06N 3/084 |
| 2020/0089977 A1* | 3/2020 | Lakshmi Narayanan | |
| | | | G06F 18/253 |
| 2020/0097778 A1 | 3/2020 | Rozner et al. | |
| 2020/0098116 A1* | 3/2020 | Rozner | G06V 20/10 |
| 2022/0237866 A1* | 7/2022 | Stein | G06T 17/00 |
| 2023/0222671 A1* | 7/2023 | Kim | G06T 7/136 |
| | | | 382/103 |

OTHER PUBLICATIONS

Yoo et al., DeepFind: Sensor-driven Inference Acceleration for Continuous Deep Mobile Vision Applications, The 21st International Workshop on Mobile Computing Systems and Applications, ACM HotMobile 2020, Austin, Texas, Mar. 3-4, 2020.

Sachenko et al., Sensor drift prediction using neural networks, Proceedings of the International Workshop on Virtual and Intelligent Measurement Systems. Annapolis, pp. 88-92, Apr. 2000.

Sachenko et al., Sensor errors prediction using neural networks, Proceedings of the IEEE-INNS-ENNS International Joint Conference on Neural Networks, IJCNN 2000, Neural Computing: New Challenges and Perspectives for the New Millennium, Como, Italy, vol. 4, 2000, pp. 441-446.

Matantsev et al., Method for Minimizing Semiconductor Gas Sensors Errors Based on Signals Processing with Use of Artificial Neural Network, 2018 International Conference on Industrial Engineering, Applications and Manufacturing (ICIEAM), Moscow, Russia, 2018, pp. 1-4.

Sanchez et al., Measurement Correction for Multiple Sensors Using Modified Autoassociative Neural Networks, Engineering Applications of Neural Networks, EANN 2012, Communications in Computer and Information Science, vol. 311, pp. 135-144 Springer, 2012.

Wang et al., A Deep Learning Approach for Blind Drift Calibration of Sensor Networks, IEEE Sensors Journal, vol. 17, No. 13, pp. 4158-4171, 1 Jul. 1, 2017.

Cullen, The vestibular system: multimodal integration and encoding of self-motion for motor control, Mar. 1, 2012, https://www.cell.com/trends/neurosciences/fulltext/S0166-2236(11)00198-6?_returnURL=https%3A%2F%2Flinkinghub.elsevier.com%2Fretrieve%2Fpii%2FS0166223611001986%3Fshowall%3Dtrue.

Angelaki et al., Vestibular System: The Many Facets of a Multimodal Sense, Annual Review of Neuroscience 31(1), pp. 125-150,Feb. 2008 , https://www.researchgate.net/journal/0147-006X_Annual_Review_of_Neuroscience (https://www.annualreviews.org/doi/pdf/10.1146/annurev.neuro.31.060407.125555).

Britton et al., Vestibular and Multi-Sensory Influences Upon Self-Motion Perception and the Consequences for Human Behavior, Front. Neurol., Mar. 7, 2019.

Lu et al., A Deformation Robust ISAR Image Satellite Target Recognition Method Based on PT-CCNN, vol. 9, Feb. 3, 2021.

International Searching Authority, PCT/EP2022/066414, PCT, Sep. 22, 2022.

Forster et al., "Unsupervised Classifier Self-Calibration through Repeated Context Occurences: Is there Robustness against Sensor Displacement to Gain?", 13th IEEE International Symposium on Wearable Computers (ISWC 2009), Sep. 2009, pp. 77-84, doi: 10.1109/ISWC.2009.12.

Japan Patent Office, "Notice of Reasons for Refusal", Jul. 10, 2025, 07 Pages, JP Application No. 2023-577932.

Khan et al., "Sensor calibration and compensation using artificial neural network", ISA Transactions, Jul. 2003, pp. 337-352, vol. 42, No. 3, doi: https://doi.org/10.1016/S0019-0578(07)60138-4.

Ranjeeth et al., "Sensor Auto-Calibration Using Neural Networks for Riss Mechanization During Long GNSS Outages", 6th ESA International colloquium of Scientific and Fundamental Aspects of Galileo, Oct. 2017, 1 page.

\* cited by examiner

SENSOR COMPENSATION USING BACKPROPAGATION

BACKGROUND

The present invention relates generally to a method, system, and computer program product for machine learning. More particularly, the present invention relates to a method, system, and computer program product for sensor compensation using backpropagation.

Artificial intelligence (AI) technology has evolved significantly over the past few years. Modern AI systems are achieving human level performance on cognitive tasks like converting speech to text, recognizing objects and images, or translating between different languages. This evolution holds promise for new and improved applications in many industries.

An Artificial Neural Network (ANN)—also referred to simply as a neural network—is a computing system made up of a number of simple, highly interconnected processing elements (nodes), which process information by their dynamic state response to external inputs. ANNs are processing devices (algorithms and/or hardware) that are loosely modeled after the neuronal structure of the mammalian cerebral cortex but on much smaller scales. A large ANN might have hundreds or thousands of processor units, whereas a mammalian brain has billions of neurons with a corresponding increase in magnitude of their overall interaction and emergent behavior.

A Deep Learning Neural Network, referred to herein as a Deep Neural Network (DNN) is an artificial neural network (ANN) with multiple hidden layers of units between the input and output layers. Similar to shallow ANNs, DNNs model complex non-linear relationships. For example, a Convolutional Neural Network (CNN) is a type of DNN that is particularly well-suited for analyzing digital images. A typical application for a CNN is object recognition in digital images. For example, a CNN may be employed to analyze images for facial recognition in a security application or for monitoring video of an assembly line to identify objects with defects.

SUMMARY

The illustrative embodiments provide for sensor compensation using backpropagation. An embodiment includes training a first convolutional neural network (CNN) using a plurality of training images. The embodiment also includes generating, upon determining that the first CNN has been trained, a first trained CNN and a second trained CNN, wherein the first trained CNN and the second trained CNN are based on the first CNN. The embodiment also includes adding an interface layer to the second trained CNN. The embodiment also includes processing a first image in a sequence of images using the first trained CNN to generate a first result vector. The embodiment also includes processing a second image that is subsequent to the first image in the sequence of images using the first trained CNN to generate a second result vector. The embodiment also includes processing the second image using the second trained CNN and sensor data input to the interface layer to generate a third result vector, where the processing of the second image using the second trained CNN includes modifying the sensor data using a compensation value. The embodiment also includes comparing the third result vector to the second result vector to generate an error value. The embodiment also includes calculating a modified compensation value using the error value. The embodiment further includes generating a sensor-compensated trained CNN based on the second trained CNN with the modified compensation value. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
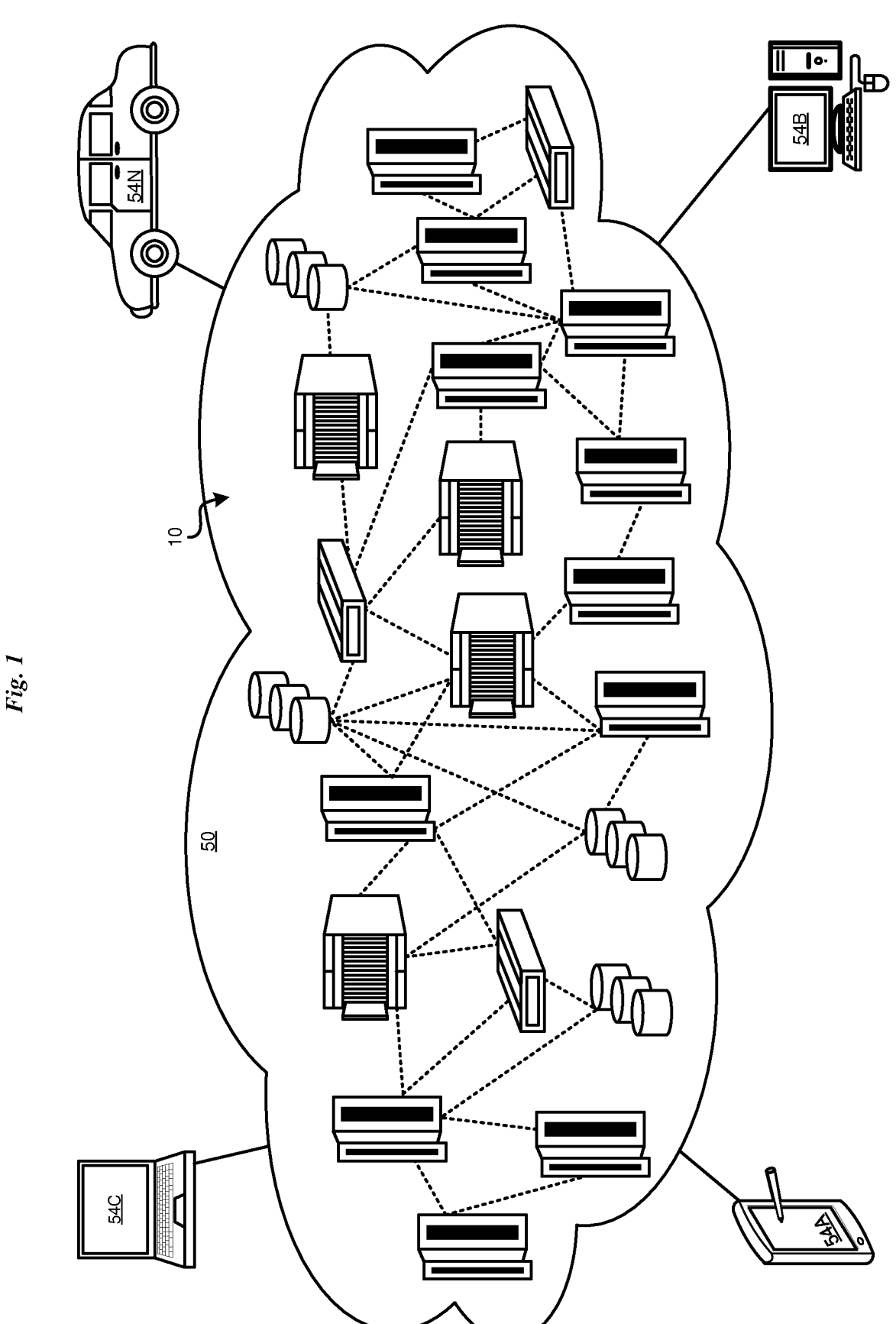
FIG. 1 depicts an illustrative cloud computing environment.

Various AI technologies utilize CNNs and other types of neural networks to perform a variety of machine learning tasks. A CNN that is employed to recognize objects in images is sometimes referred to as an image classifier, or simply a classifier. Thus, a "classifier" as referred to herein is a neural network-based algorithm that automatically orders or classifies data into one or more "classes." A classifier receives image data as an input and outputs an indication of a class of object present in the input image. As a very simple example, suppose a classifier is trained to recognize a set of basic shapes, such as squares, circles, and triangles. The output of such a classifier may provide an indication of which of these shapes is present in an input image. In practice, the actual output will be an output vector, or list, of probability values. So, for the simple example of a classifier that is trained to detect a square, circle, or triangle, the output may be a vector that includes three probability values: a probability that the image is a square, a probability that the image is a circle, and a probability that the image is a triangle. Ideally, one of these three probability values will be much larger than the other two, for example (95, 3, 2) for (square, circle, triangle), making it clear from the output probability values which of the three shapes is in an image (square in this simplified example).

As eluded to above, a CNN classifier is able to identify objects in images after being "trained" to do so. When a classifier processes an image, it does so using a series of filters that each include one or more weight values, or simply weights. Training a CNN classifier is a process that involves adjusting the values of the weights until the classifier is able to provide accurate outputs.

There are many different techniques for training a classifier. Many techniques involve using image data that includes correct answers for each image. A common technique uses "backpropagation." Training a classifier using backpropagation is an iterative process that repeats for each of a large number of training images. The process includes calculating an error value for each image. The error value is based on the difference between the classifier's output for an image and the correct answer for that image. The values of one or more of the weights are then adjusted at each iteration to gradually reduce the error value.

Typically, the accuracy of a classifier is related to the amount of training data (i.e., number of unique digital images) used to train the classifier. As the amount of training data used to train a neural network increases, the accuracy of the classifier tends to increase as well. As a result, training an accurate classifier is very time-consuming and computationally expensive.

For example, in training a CNN classifier to correctly identify faces, thousands of images of faces (of people, animals, famous faces, and so on) are input into the classifier neural network as training data. The neural network processes each image using weights, comparing the training output against the desired output. A goal is that the training output matches the desired output, e.g., for the neural network to correctly identify each photo (facial recognition).

The classifier that results from this training is a model that includes the optimized weights. This model is then used to classify (i.e., recognize) objects in new image data. The resulting model may offer a high degree of accuracy, but still requires a time-consuming and computationally expensive process to perform image classification. There has therefore been an interest in seeking ways to reduce the time and computational expense without sacrificing accuracy.

A motivation for reducing the time and computational expense of CNN classifiers relates to improving the performance of applications that use such classifiers. In an edge computing architecture, such applications typically operate on edge devices. Edge devices include such devices as cell phones, digital cameras, client computers (i.e., laptop computers, desktop computers, etc.). Performing at least some classification processing on an edge device as opposed to a centralized cloud has the potential to improve application performance. For example, if the edge devices are required to exchange all images, data, computational results, etc. with a remote image processing system, this presents a heavy burden on communication networks (which are often wireless and thus have even less bandwidth) between the edge device and the remote system. Also, using a remote system to perform all analytical calculations for captured images (e.g., for labeling objects the captured images) poses scaling problems when determining which nodes and/or data centers in the remote system are to be allocated to edge devices.

If the edge devices have their own computational power to perform any type of analysis of the images they capture, then they would not need the computational resources in the cloud or other remote systems. However, edge devices often have limited computational and/or storage capacities. Thus, one or more discloses embodiments solve this problem by using previously performed calculations (by the edge devices themselves and/or by remote systems) on a captured image, particularly when the previously performed calculations are from previously-captured images.

In one or more embodiments, a CNN analyzes an image that is a video frame is a series of successive video frames of a video and caches CNN-based analysis results for use with other subsequently captured images (e.g., where the images differ due to camera movement while a video is being recorded). However, as also described herein, one or more embodiments also cache non-CNN generated data about an image for reuse when the capturing camera moves (thus capturing a new image).

In some embodiments, images are captured by a moving camera on a phone, a drone, a satellite, a dashcam, or any of a variety of other devices. The captured images may vary due to the movement of the camera, even though some of the information in the images is redundant, due to the overlap between the subsequent captured images. In some embodiments, such captured images may be used to monitor equipment (e.g., oil rigs), wildlife, inventory (e.g., in a store, a warehouse, etc.), public infrastructure (e.g., roads, power lines, etc.), or a variety of other uses.

In some embodiments, a moving camera capturing a series of images as part of a video or a series of images taken at regular or random intervals captures some objects that look the same from one image to the next while other objects look different from one image to the next. For example, a user holding out a phone to take a series of pictures of himself (i.e., "selfies") while riding on an escalator may capture images in which the user appears the same from one image to the next, but background objects look different from one image to the next.

In some embodiments, the user or system may want to label some objects in all of the images in the series of successive images, whether they are changing or not. However, if every image is analyzed in its entirety, then there will be duplicate processing of the unchanging portion of the series of images.

Thus, in some embodiments, duplicate processing of images is reduced by performing a full-image analysis of a first image in a series of images, caching the full-image analysis results of the first image, determine which sections of a subsequent second consecutive image from the series of images have not changed (e.g., the face of the user taking a selfie), determine that other sections of the image have changed, analyze only the changed sections of the image, and combine the results of the analysis for the changed sections with the cached results for the unchanged sections to create a full analysis of the second image. However, this process still requires considerable computational power (e.g., for determining which sections have changed and which sections have not changed for each entire image). The amount of computational power required for this process will still often require more computational power and storage resources than a typical edge device has, so a remote system must still be called upon, thereby slowing down the overall process.

Thus, in order to further reduce the computational effort required for image classification processing, disclosed embodiments employ sensors on edge devices to determine camera shift. In some embodiments, non-limiting examples of such sensors include one or more of an accelerometer, a magnetometer, a gyroscope, a global positioning system, and/or a proximity sensor, one or more of which may be capable of sensing movement or inertia along and/or about two or three axes. This information allows the edge device to understand the amount of image shifting that is caused by the camera shift, and apply this understanding when deciding which cached analysis results are to be reused on subsequent images from the series of successive images.

As mentioned above, images are often captured in sequence of a same object by a moving camera. However, the movement of the camera causes the object to "move" between different images in the sequence of images. Such movement may be linear (i.e., the camera moves from side to side or up and down while keeping the same normal orientation with the object being photographed); rotational (i.e., the camera stays in a same location, but pans left/right and/or up/down); or zooming (i.e., the camera maintains the same normal orientation to the object being photographed, but moved towards or away from the object being photographed). For purposes of illustration, linear movement of the camera is discussed in accordance with one or more of the disclosed embodiments.

In some such embodiments, suppose a first image is taken by a camera at a first time t0, and a second image is taken by the camera at time t1 (after time t0), and between time t0 and time t1 the camera moved laterally, resulting in the second image differing from the first image. The second image still includes an object recognized by a CNN classifier in the first image, but the location of the object in the frame of the image has shifted compared to the first image. Also, some regions of the first image are identical to some regions of the second image, while some regions of the first image are not present in the second image, and some regions of the second image are not present in the first image. In some embodiments, sensors in the camera detect the movement of the camera between the time t0 that the first image was captured and the time t1 that the second image was captured, thus assisting in identifying the regions of the second image that are identical to regions of the first image.

However, it is known that such sensors have limited accuracy, which is further affected by various types of noise, fluctuations in temperature, and calibration errors or instability. Therefore, the use of such sensors to detect camera movement between captured images has the potential to introduce errors due to sensor variations. In some embodiments, the sensors are calibrated periodically to avoid such errors. However, it is known that calibrating such sensors is a difficult and time-consuming process.

Therefore, embodiments disclosed herein provide a solution to this technical problem that compensates for sensor variations without the need to calibrate the sensors. A process, according to some embodiments, trains a first convolutional neural network (CNN) using a plurality of training images. Next, the process generates, upon determining that the first CNN has been trained, a first trained CNN and a second trained CNN based on the first CNN. The process then adds an interface layer to the second trained CNN.

In some such embodiments, a first image is next processed using the first trained CNN to generate a first result vector. For example, in some embodiments, the first image is captured by an image sensor on a camera or other edge device and includes a depiction of an object detected by the CNN. Next, at a second image is processed that is subsequent to the first image in the sequence of images. The processing uses the first trained CNN to generate a second result vector. In some embodiments, the second image also includes a depiction of the object in the first image, and the object is again detected by the CNN in the second image. In some embodiments, the process includes generating a label for the detected object and displaying the object and generated label. In some embodiments, the process includes caching the first result vector output from the first trained CNN, and utilizing the cached first result vector output from the first trained CNN to label the object in the second image based on the movement of the camera and the pixel shift.

Next, the process processes the second image using the second trained CNN and sensor data input to the interface layer to generate a third result vector. In some embodiments, the process includes generating the sensor data by a movement sensor on a camera or other edge device. In such embodiments, the sensor data describes a movement of the camera or other edge device after the image sensor captures the first image and before the image sensor captures a second image. Non-limiting embodiments of the movement sensor include an accelerometer, a magnetometer, a gyroscope, a global positioning system, and a proximity sensor. In some embodiments, the movement is used to detect a pixel shift between the first image and the second image.

Next, the processing of the second image using the second trained CNN includes modifying the sensor data using a compensation value. The process then compares the third result vector to the second result vector to generate an error value. The process then calculates a modified compensation value using the error value. In some embodiments, the calculating of the modified compensation value includes using a backpropagation algorithm to determine the modified compensation value. In some such embodiments, the backpropagation algorithm includes determining the modified compensation value based on a resulting reduction in the error value.

Finally, the process generates a sensor-compensated trained CNN based on the second trained CNN with the modified compensation value. In some embodiments, a third image that is subsequent to the second image in the sequence of images is processed using the sensor-compensated trained CNN and updated sensor data input to the interface layer to generate a fourth result vector. In some embodiments, the process includes generating the updated sensor data by a movement sensor on the camera, where the updated sensor data describes an updated movement of the camera after the image sensor on the camera captures the second image and before the image sensor on the camera captures the third image. In some embodiments, the process includes detecting an updated pixel shift between the second image and the third image based on the fourth result vector. In some embodiments, the process includes determining that the third image includes a depiction of an object from the first image and the second image based on the updated movement of the camera and the updated pixel shift.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)s).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this Figure depicts an illustrative cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
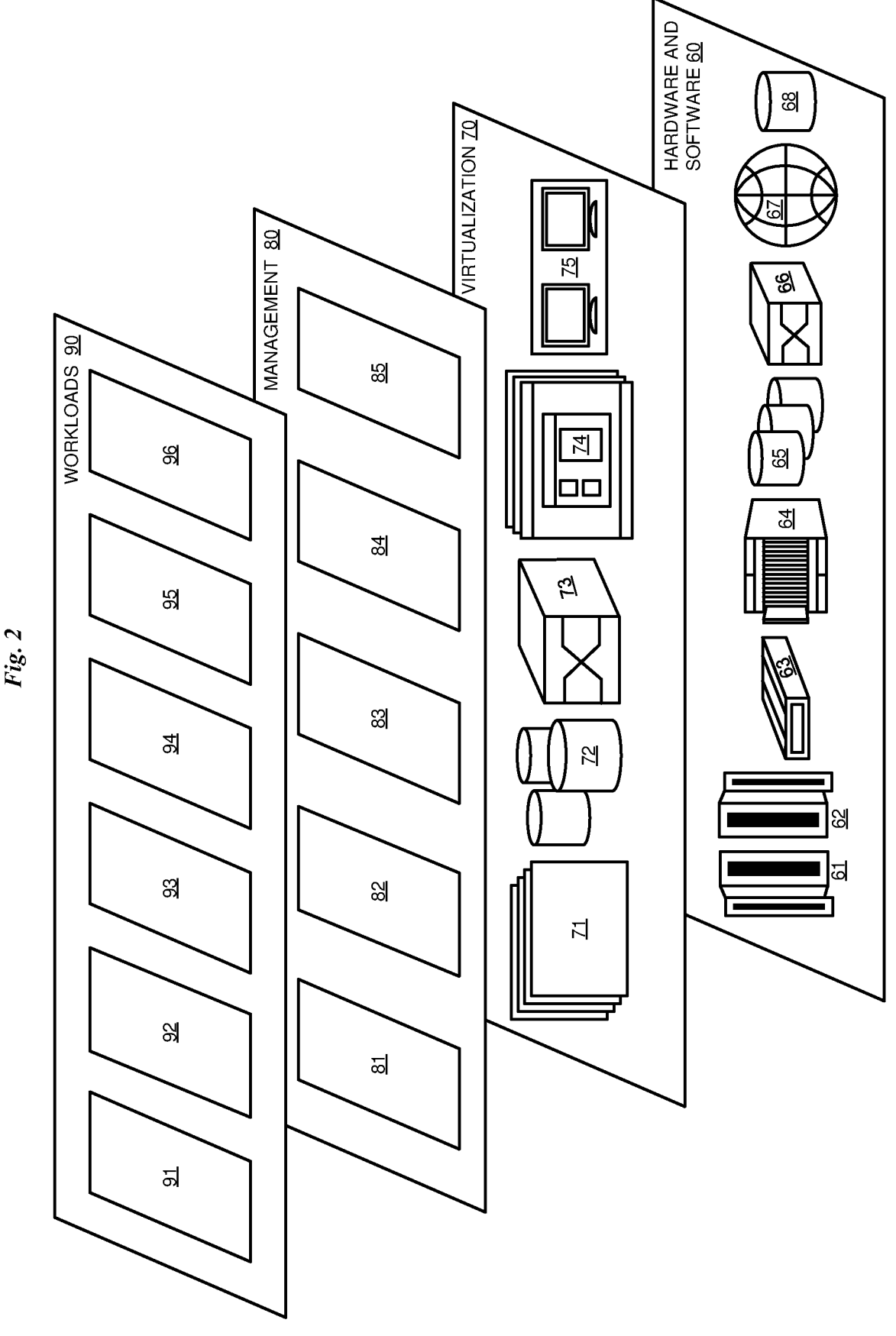
FIG. 2 depicts a set of functional abstraction layers provided by cloud computing environment (Fig.

With reference to FIG. 2, this Figure depicts a set of functional abstraction layers provided by cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and image processing 96, which performs one or more of the features of the present invention described herein.

Figure 3:
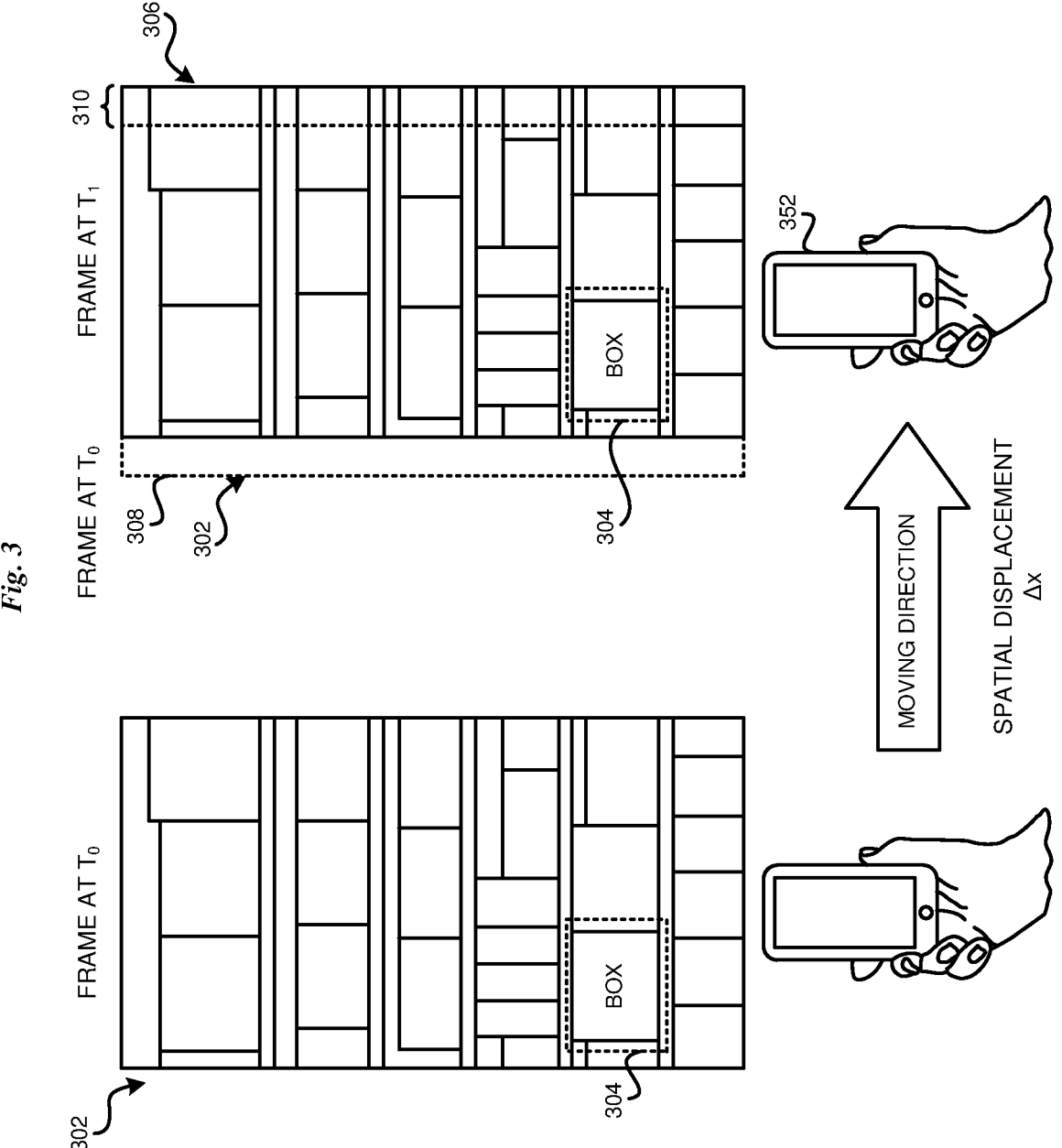
FIG. 3 depicts a block diagram of example images captured in sequence by an edge device in accordance with an illustrative embodiment.

With reference to FIG. 3, this figure depicts a block diagram of example images captured in sequence by an edge device in accordance with an illustrative embodiment. In the illustrated embodiment, the edge device is a camera 352, however other image capturing devices are used in alternative embodiments.

As shown, a first image 302 is taken by a camera 352 (analogous to camera 152 shown in FIG. 1) at a first time t0. First image 302 captures the images of several objects, background, etc., including an object 304 (e.g., a BOX of cereal). At time t1 (after time t0), the camera 352 has moved to the right, resulting in a second image 306. As shown in FIG. 3, the second image 306 still includes the object 304, but it has now shifted to the left of the captured second image 306 (due to the camera 352 moving to the right). While some of the image from first image 302 is lost in the second image 306 (depicted as lost portion 308), it has picked up new imagery shown in shift size 310.

Assume now that a CNN analysis (or other image analysis) has been performed, resulting in the object 304 being identified as a box of cereal. Assume further that a label "BOX" has been created for that box of cereal, and that label is superimposed on top of the image of the box of cereal.

When the second image 306 is captured (including the image of the box of cereal), a new CNN analysis can be performed on all of the second image, thus resulting again in the identification of the box of cereal (and the labeling thereof). Alternatively, the system could cache the results of each portion of the first image 302. That is, the pixel information, identity, and label for each object is cached. Thereafter, the pixel information for each subsection of the second image 306 is captured. If a subsection in the second image matches the pixel information in a cached result from the first image 302, then the object is labeled in the second image 306 with the same label as found in the first image 302. However, this requires extensive computational power to find and compare every section of the two images. In addition, the pixel values sampled at the same target locations in two frames may slightly differ, due to lighting, sampling issues in the image sensor, etc., thus further making exact pixel matching impractical.

Therefore, in some embodiments, sensors in the camera 352 detect the movement of the camera 352 between the time that the first image 302 was captured and the second image 306 was captured, thus assisting in identifying the regions of the second image that are identical to regions of the first image.

Figure 4:
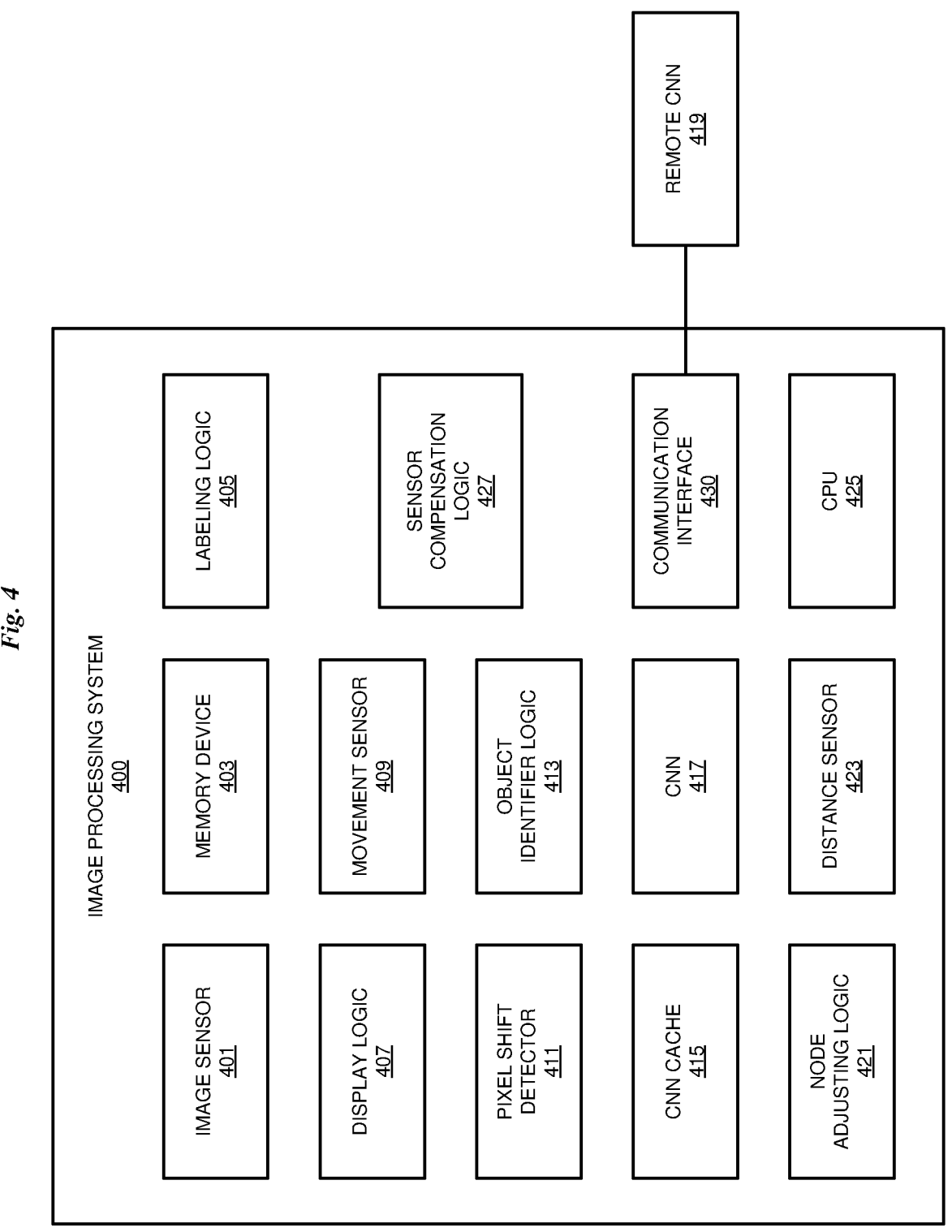
FIG. 4 depicts a block diagram of an example image processing system in accordance with an illustrative embodiment.

With reference to FIG. 4, this figure depicts a block diagram of an example image processing system 400 in accordance with an illustrative embodiment. In some embodiments, at least some elements of the image processing system 400 are deployed in workloads layer 90 of FIG. 2. By way of example, in some embodiments, at least some elements of the image processing system 400 are implemented using image processing 96 in FIG. 2.

In some embodiments, the image processing system 400 includes an image sensor 401, a memory device 403, labeling logic 405, display logic 407, a movement sensor 409, a pixel shift detector 411, object identifier logic 413, a CNN cache 415, a CNN 417, node adjusting logic 421, a distance sensor 423, a Central Processing Unit (CPU) 425, and sensor compensation logic 427. In alternative embodiments, the image processing system 400 includes some or all of the functionality described herein but grouped differently into one or more modules. In some embodiments, the functionality described herein is distributed among a plurality of systems, which may be local to each other or remotely located from each other, and which can include combinations of software and/or hardware based systems, for example Application-Specific Integrated Circuits (ASICs), computer programs, or smart phone applications.

In some embodiments, at least some elements of the image processing system 400 are deployed in an edge device, such as a smart phone, tablet computer, laptop computer, or other edge device. In some embodiments, image sensor 401 is an optic sensor (e.g., a Complementary Metal-Oxide-Semiconductor—CMOS) that converts light into an electronic signal, which is then sent to a memory device 403 (e.g., a memory card). In some embodiments, the image sensor 401 is operable to capture still images or video in the form of a series of successive images.

In some embodiments, labeling logic 405 is a hardware circuit that converts an output from an algorithm (e.g., using CNN) into a text label. For example, and in one embodiment, labeling logic takes an output vector from a CNN, such as (4,5,3,1), as an input, and outputs a label, for example "BOX," that can be overlaid onto a digital image using display logic 407.

In some embodiments, movement sensor 409 is a sensor that detects movement of the camera 452. In some embodiments, movement sensor 409 is a self-contained unit, such as an accelerometer. In alternative embodiments, movement sensor 409 uses inputs from an external device (not shown), such as a gear or wheel. That is if camera 452 is mounted on a track, and the movement of camera 452 along the track is causes by gears/wheels in a mechanical device turning (thus propelling the camera), sensor readings describing the movement of such gears/wheels accurately describe the movement of the camera 452.

In some embodiments, the pixel shift detector 411 is a hardware device that captures movement of a particular pixel or set of pixels. For example, a group of one or more pixels that is found in a first image and may later be found in second image. As such, the pixel shift detector 411 measures the pixel distance between the location of the group of pixels in the first image and the group of pixels in the second image.

In some embodiments, node adjusting logic 421 is logic that adjusts weights and/or algorithms in the CNN using regressive analysis. In some such embodiments, node adjusting logic includes a processor that has been preconfigured to determine the accuracy of the predicted outputs and then adjust the weight and/or algorithm in the neurons in the CNN until the prediction outputs accurately describe the photographed object, for example using backpropagation.

In some embodiments, distance sensor 423 detects a distance from the camera 452 to one or more objects being photographed, for example using a proximity sensor. In some embodiments, distance sensor 423 utilizes a phase shift in an electronic signal from when the signal is emitted from the distance sensor 423 to when the signal is bounced back and received by the distance sensor 423. In some embodiments, the distance sensor 423 uses signals that are electromagnetic (e.g., infrared light) or sonic (e.g., ultrasonic sounds). Such signals have a wavelength, whose phase is different from the time that it is emitted to the time that it is bounced back and received. This wavelength difference is known as a phase shift, and (when combined with a timer) precisely measures distance without using a physical measuring device (e.g., a measuring tape). In some embodiments, distance from the camera 452 to the object being photographed is determined using parallax. That is, if a user moves the camera 452 by a certain distance while photographing the same scene/target, the camera 452 will see the same targets or visual features that appear on both frames. Due to the camera displacement, the images of the same targets will appear in slightly different locations on each frame, which is called parallax. These on-frame location differences and the camera displacement are then used to estimate the distance to the target, such that a separate distance measurement sensor is not necessary. As such, in some embodiments, only motion sensors are needed to measure the amount of movement by the camera 452 in order to perform one or more of the steps described herein.

In some embodiments, the functions performed by one or more of labeling logic 405, display logic 407, object identifier logic 413, CNN 417, and node adjusting logic 421 are performed by an on-board CPU 425.

In some embodiments, the object identifier logic 413 is logic (e.g., the CNN logic or an abbreviated version of the CNN logic described herein) used to identify an object within a photograph. In an embodiment, if the camera 452 has sufficient processing power to run a full version of the CNN, then it will do so. However, if the camera 452 has insufficient processing power to run a full version of the CNN, then a limited version (e.g., in which only one convolution/pooling operation is performed, in which only a limited number of prediction outputs is supported, etc.) is performed. In some embodiments, the object identifier logic 413 uses movement information obtained from the movement sensor 409 and pixel shift detector 411 to identify and re-label the object in subsequent photographs. For example, assume that the label is found in a CNN cache 415, having been previously created by a local on-board CNN 417 or a remote CNN 419 that is (preferably wirelessly) connected to the camera 452 via a network interface 430 (analogous to network interface 130 shown in FIG. 1).

However, it is known that such sensors have limited accuracy, which is further affected by various types of noise, fluctuations in temperature, and calibration errors or instability. Therefore, the use of such sensors to detect camera movement between captured images has the potential to introduce errors due to sensor variations. In some embodiments, the sensors are calibrated periodically to avoid such errors. However, it is known that calibrating such sensors is a difficult and time-consuming process.

Therefore, embodiments disclosed herein include sensor compensation logic 427 that generates one or more compensation values. The compensation values are then used to modify the sensor outputs from respective sensors.

Figure 5:
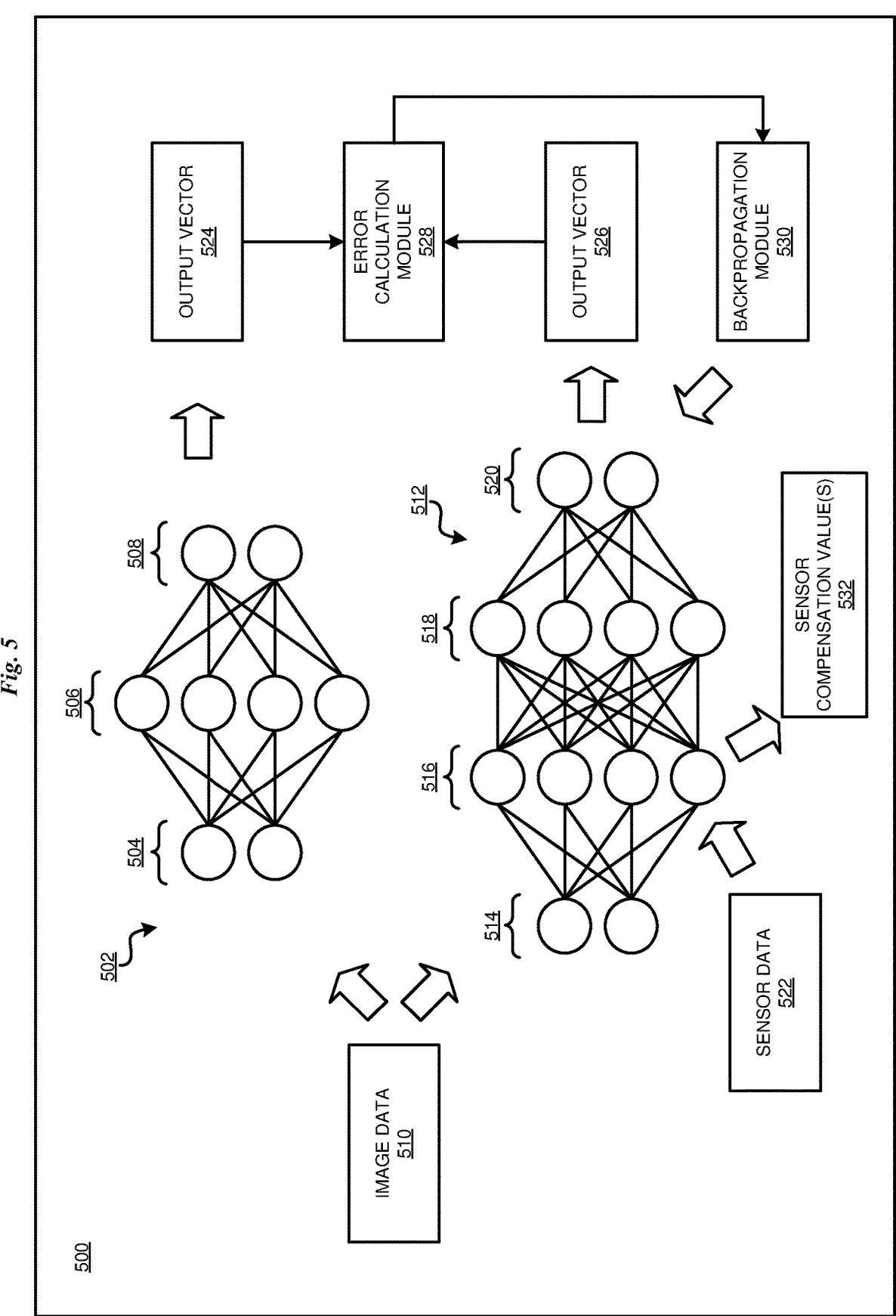
FIG. 5 depicts a block diagram of sensor compensation logic in accordance with an illustrative embodiment.

With reference to FIG. 5, this figure depicts a block diagram of sensor compensation logic 500 in accordance with an illustrative embodiment. In a particular embodiment, sensor compensation logic 500 an example of sensor compensation logic 427 of FIG. 4.

In some embodiments, the sensor compensation logic 500 includes a first CNN 502, a second CNN 512, an error calculation module 528, and a backpropagation module 530. In alternative embodiments, the sensor compensation logic 500 includes some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In some embodiments, the first CNN 502 includes an input layer 504, one or more hidden layers 506, and an output layer 508. The first CNN 502 receives image data 510 at the input layer 504 and performs image processing using the hidden layers 506. The first CNN 502 then outputs an output vector 524 from the output layer 508.

In some embodiments, the second CNN 512 includes an input layer 514, a sensor interface layer 516, one or more hidden layers 518, and an output layer 520. The second CNN 512 receives image data 510 at the input layer 514 and receives sensor data 522 at the sensor interface layer 516 from a movement sensor (e.g., from movement sensor 409 of FIG. 4). The second CNN 512 then performs image processing using the hidden layers 518 and then outputs an output vector 526 from the output layer 520. In some embodiments, the sensor interface layer 516 includes a compensation value 532 as a weight or parameter for one or more neurons. In some embodiments, the interface layer 516 receives sensor inputs from a plurality of sensors and includes a respective compensation value 532 for each sensor.

Thus, in some embodiments, the first CNN 502 is an image classifier without sensor inputs, while the second CNN 512 is an image classifier with sensor inputs. The output vectors 524 and 526 are then compared to determine the difference, which ideally should be the same. In some embodiments, the error calculation module 528 calculates the difference between the two output vectors 524 and 526 as an error value. In some embodiments, the error calculation module 528 uses a loss function to determine the error value. For example, in some embodiments, the error calculation module 528 uses cross entropy to estimate the difference between the output vectors 524 and 526. In some embodiments, the error calculation module 528 outputs a scalar value as the error value. The error calculation module 528 provides this error value to the backpropagation module 530. In some embodiments, the backpropagation module 530 employs a backpropagation algorithm that uses gradient decent to adjust the compensation value(s) 532 for the sensor(s) so as to minimize the error value.

Thereafter, the compensation values 532 are then used with the CNN 512 for image classification, effectively rendering CNN 512 as an accelerated model. Accelerated CNN 512 uses the sensor inputs to accurately determine camera movement between captured images using the compensation value(s) 532 to improve the accuracy of the sensor data. This accuracy improvement results in improvements to the accuracy of the image processing system 400 in determining distance and direction of pixel shift between the captured images.

Figure 6:
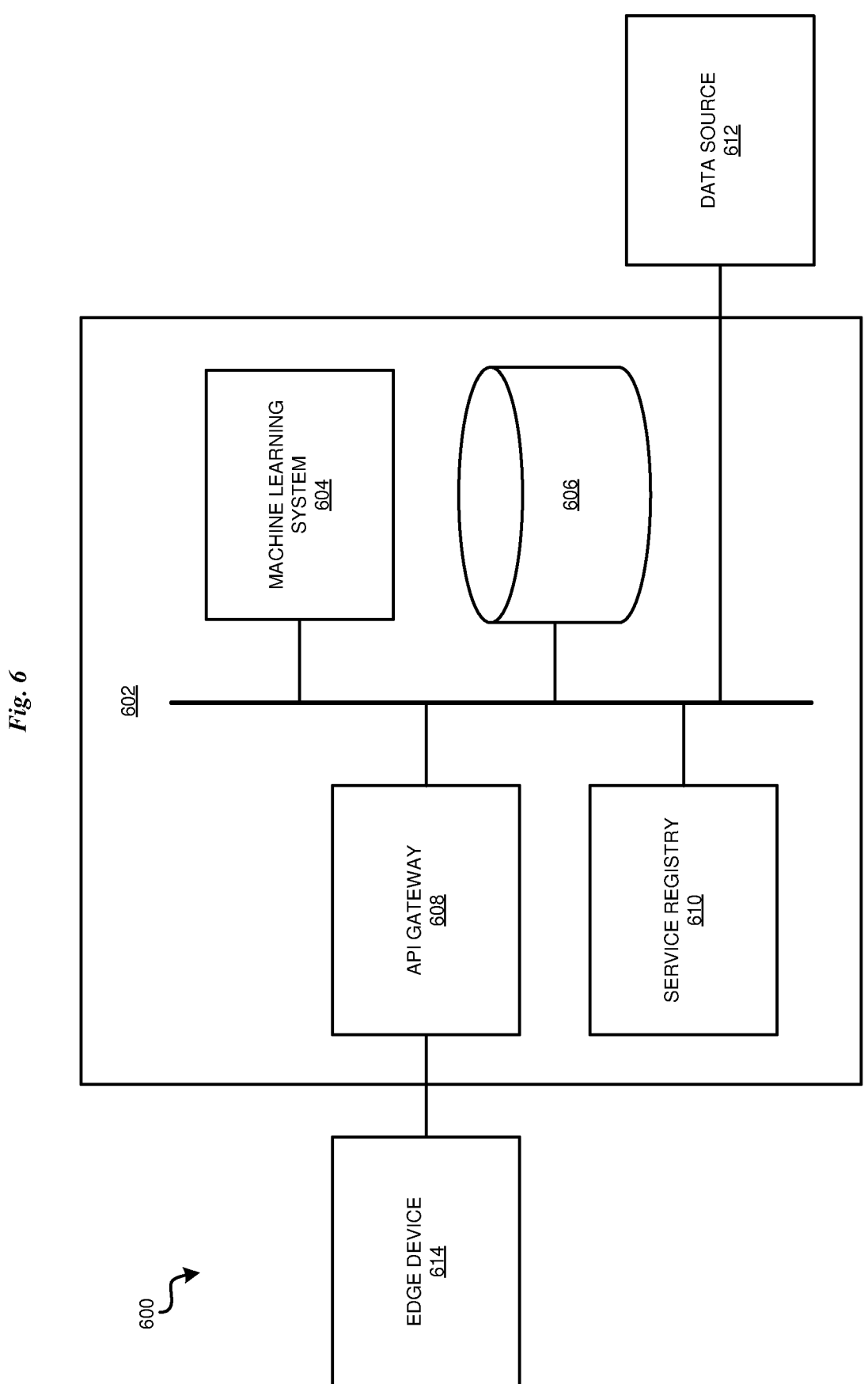
FIG. 6 depicts a block diagram of an example cloud computing environment that includes a service infrastructure in accordance with an illustrative embodiment.

With reference to FIG. 6, this figure depicts a block diagram of an example cloud computing environment 600 that includes a service infrastructure 602 in accordance with an illustrative embodiment. As discussed in connection with FIG. 4, in some embodiments, the functionality of the image processing system 400 described herein is distributed among a plurality of systems, which may be local to each other or remotely located from each other. FIG. 6 shows an example where at least some of the functionality of the image processing system 400 is provided by a cloud-based service as machine learning system 604.

In the illustrated embodiment, an edge device 614 communicates with service infrastructure 602 across one or more networks via an application programming interface (API) gateway 608. In some embodiments, the service infrastructure 602 uses a distributed cloud-based architecture. In some such embodiments, the machine learning system 604 is a cloud-based application that runs as a distributed system across one or more servers. In various embodiments, service infrastructure 602 and its associated machine learning system 604 serve multiple users and multiple tenants. A tenant is a group of users (e.g., a company) who share a common access with specific privileges to the software instance. Service infrastructure 602 ensures that tenant specific data is isolated from other tenants.

In some embodiments, edge device 614 connects with API gateway 608 via any suitable network or combination of networks such as the Internet, etc. and uses any suitable communication protocols such as Wi-Fi, Bluetooth, etc. Service infrastructure 602 may be built on the basis of cloud computing. API gateway 608 provides access to client applications like machine learning system 604. API gateway 608 receives service requests issued by client applications, and creates service lookup requests based on service requests. As a non-limiting example, in an embodiment, the edge device 614 executes a routine to initiate a request to the machine learning system 604 for image processing.

In the illustrated embodiment, the service infrastructure 602 also includes, or is otherwise associated with, at least one memory 606 that includes at least one computer readable storage medium that stores computer readable program instructions (e.g., computer readable program instructions can include, but are not limited to, the machine learning system 604 and associated components), and can store any data generated by machine learning system 604 and associated components. In the illustrated embodiment, the service infrastructure 602 includes, or is otherwise associated with, at least one processor (e.g., CPU 425 of FIG. 4) that executes computer readable program instructions stored in memory 606.

In the illustrated embodiment, service infrastructure 602 includes access to a data source 612. In some embodiments, data source 612 provides data that the machine learning system 604 may use for image processing, for example data that is used to train a CNN or may include a pre-trained CNN.

In some embodiments, the service infrastructure 602 includes one or more instances of the machine learning system 604. In some such embodiments, each of the multiple instances of the machine learning system 604 run independently on multiple computing systems. In some such embodiments, machine learning system 604, as well as other service instances of machine learning system 604, are registered in a service registry 610. In some embodiments, service registry 610 maintains information about the status or health of each service instance including performance information associated each of the service instances.

Figure 7:
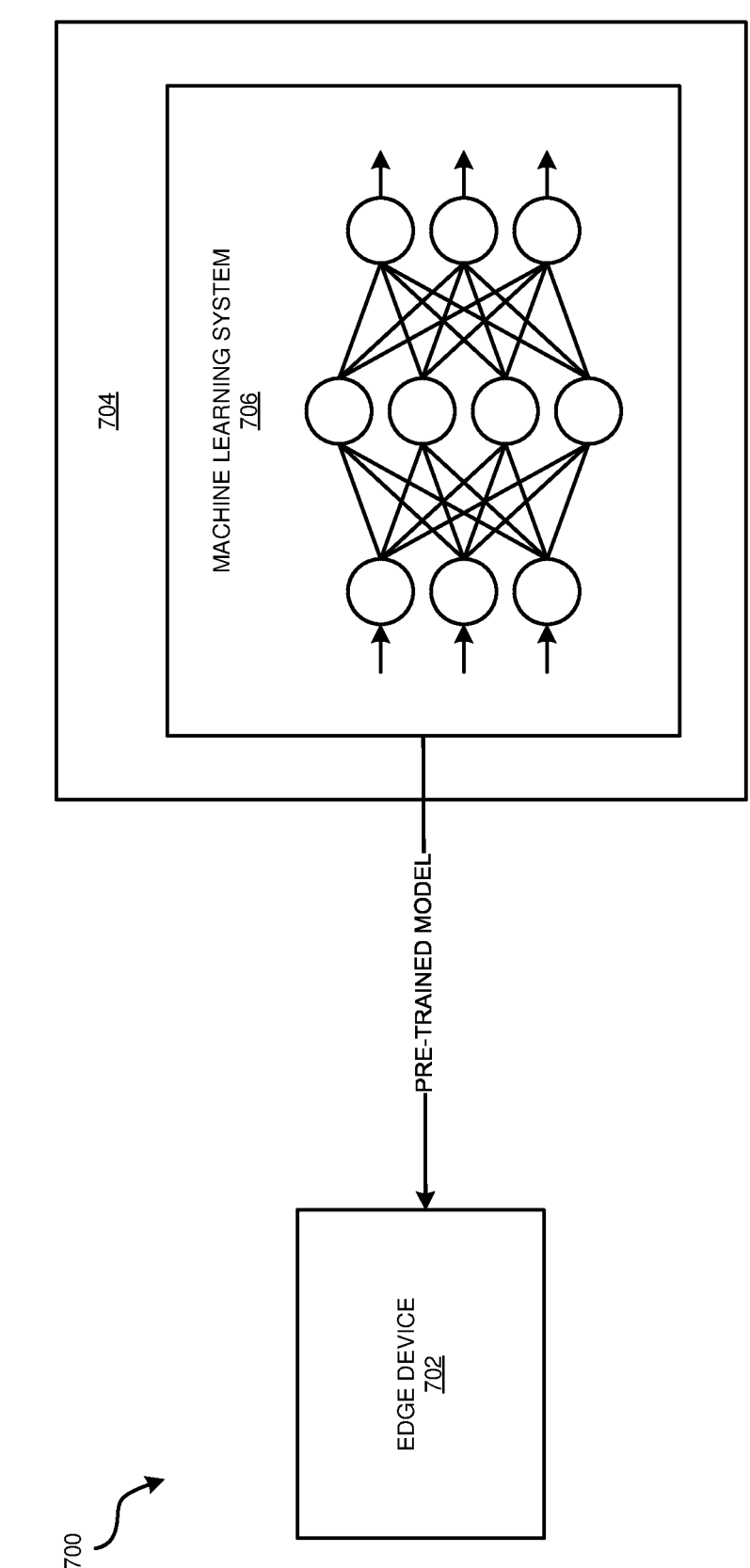
FIG. 7 depicts a block diagram of an example of a system architecture in accordance with illustrative embodiments.
Figure 8:
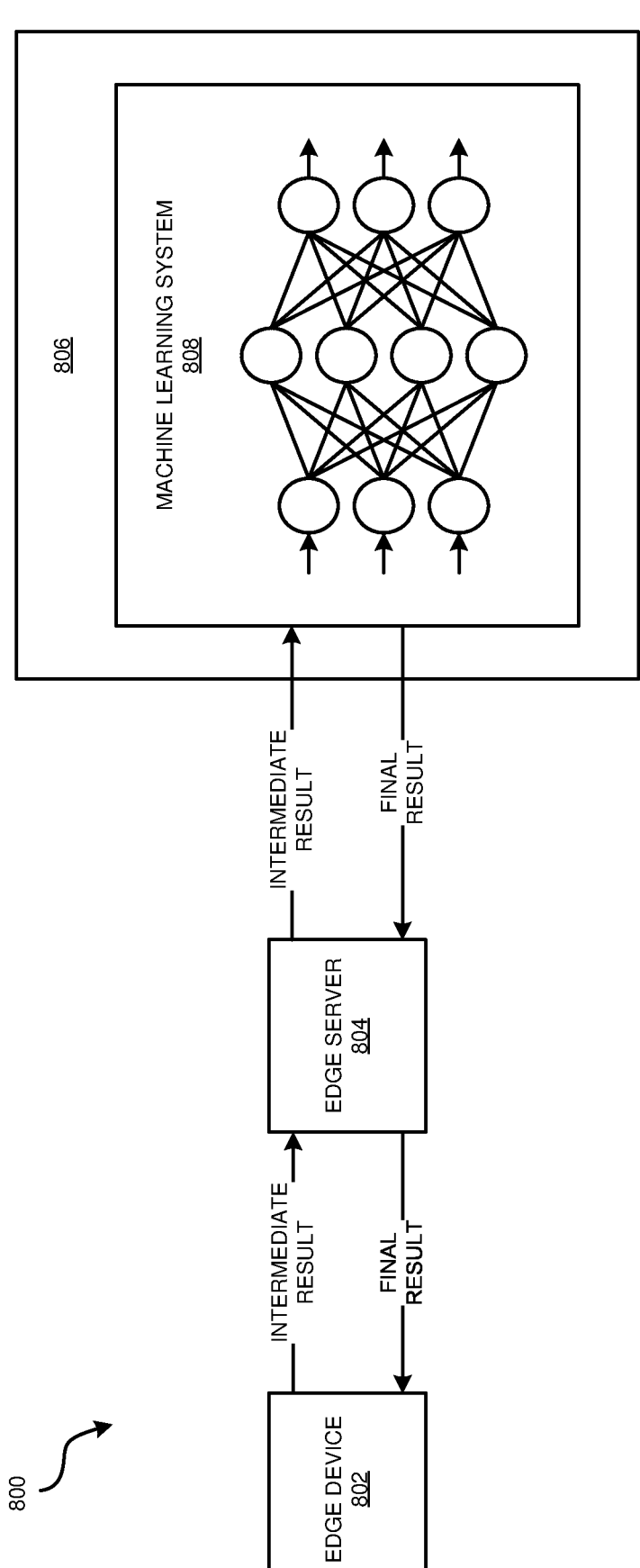
FIG. 8 depicts a block diagram of an example of a system architecture in accordance with illustrative embodiments.

With reference to FIGS. 7 and 8, these figures depict block diagrams of respective examples of system architectures 700/800 in accordance with illustrative embodiments. In some embodiments, the example system architectures 700/800 are non-limiting examples of system architectures for the image processing system 400 of FIG. 4, and still further embodiments include alternative system architectures. In some embodiments, one or more elements of the image processing system 400 of FIG. 4 are included in, and/or are accessible by, an edge device, such as camera 352 of FIG. 3. For example, in some embodiments, one or more elements of the image processing system 400 of FIG. 4 are accessible by an edge device via an API gateway, such as the API gateway 608 of FIG. 6.

For example, with reference to FIG. 7, in some embodiments, the system architecture 700 includes an edge device 702 in communication with a service infrastructure 704 that includes a machine learning system 706. In the example shown in FIG. 7, the edge device 702 is an example of an edge device that includes most or all of the elements of the image processing system 400. However, the edge device 702 utilizes a cloud-based machine learning system 706 that provides a pre-trained model that the edge device 702 uses as the CNNs. In some such embodiments, the edge device 702 uses the pre-trained model for image classification. In alternative embodiments, the edge device 702 uses the pre-trained model as a basis for transfer learning, and further trains the pre-trained model before using the model for classification.

As another example, with reference to FIG. 8, in some embodiments, the system architecture 800 includes an edge device 802 in communication with an edge server 804, which in turn is in communication with a service infrastructure 806 that includes a machine learning system 808. In the example shown in FIG. 8, the edge device 802, edge server 804, and service infrastructure 806 each include elements of the image processing system 400 as needed to perform the image processing of the CNN in a distributed manner. As shown in FIG. 8, the edge device 802 performs a portion of the CNN processing, and provides an intermediate result to the edge server 804. The edge server 804 performs a different portion of the CNN processing, and provides a different intermediate result to the machine learning system 808 of the service infrastructure 806. Then the machine learning system 808 performs a final portion of the CNN processing, and provides a final result back to the edge server 804, which in turn provides the final result back to the edge device 802.

In still another embodiment, either the edge server 804 or the service infrastructure 806 is omitted. In such embodiments, the CNN processing is shared between the edge device 802 and either the edge server 804 or the machine learning system 808.

Figure 9:
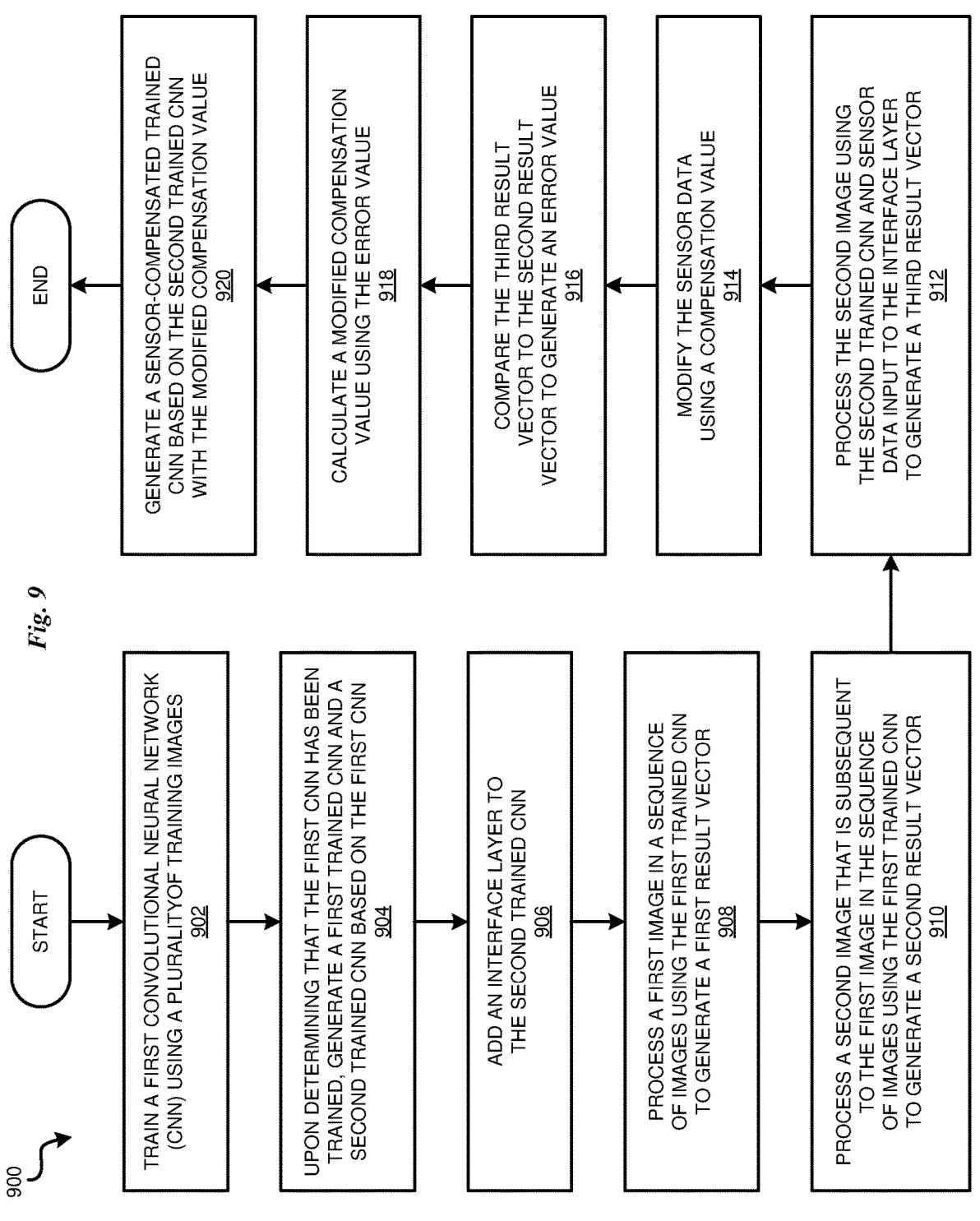
FIG. 9 depicts a flowchart of an example process for sensor compensation using backpropagation in accordance with an illustrative embodiment.

With reference to FIG. 9, this figure depicts a flowchart of an example process 900 for sensor compensation using backpropagation in accordance with an illustrative embodiment. In a particular embodiment, the image processing system 400 carries out the process 900.

In an embodiment, at block 902, the process trains a first convolutional neural network (CNN) using a plurality of training images. Next, at block 904, the process generates, upon determining that the first CNN has been trained, a first trained CNN and a second trained CNN based on the first CNN. Next, at block 906, the process adds an interface layer to the second trained CNN.

Next, at block 908, the process processes a first image in a sequence of images using the first trained CNN to generate a first result vector. For example, in some embodiments, the first image is captured by an image sensor on a camera or other edge device and includes a depiction of an object detected by the CNN. Next, at block 910, the process processes a second image that is subsequent to the first image in the sequence of images using the first trained CNN to generate a second result vector. In some embodiments, the second image also includes a depiction of the object in the first image, and the object is again detected by the CNN in the second image. In some embodiments, the process includes generating a label for the detected object and displaying the object and generated label. In some embodiments, the process includes caching the first result vector output from the first trained CNN, and utilizing the cached first result vector output from the first trained CNN to label the object in the second image based on the movement of the camera and the pixel shift.

Next, at block 912, the process processes the second image using the second trained CNN and sensor data input to the interface layer to generate a third result vector. In some embodiments, the process includes generating the sensor data by a movement sensor on a camera or other edge device. In such embodiments, the sensor data describes a movement of the camera or other edge device after the image sensor captures the first image and before the image sensor captures a second image. Non-limiting embodiments of the movement sensor include an accelerometer, a magnetometer, a gyroscope, a global positioning system, and a proximity sensor. In some embodiments, the movement is used to detect a pixel shift between the first image and the second image.

Next, at block 914, the processing of the second image using the second trained CNN includes modifying the sensor data using a compensation value. Next, at block 916, the process compares the third result vector to the second result vector to generate an error value. Next, at block 918, the process calculates a modified compensation value using the error value. In some embodiments, the calculating of the modified compensation value includes using a backpropagation algorithm to determine the modified compensation value. In some such embodiments, the backpropagation algorithm includes determining the modified compensation value based on a resulting reduction in the error value.

Next, at block 920, the process generates a sensor-compensated trained CNN based on the second trained CNN with the modified compensation value. In some embodiments, a third image that is subsequent to the second image in the sequence of images is processed using the sensor-compensated trained CNN and updated sensor data input to the interface layer to generate a fourth result vector. In some embodiments, the process includes generating the updated sensor data by a movement sensor on the camera, where the updated sensor data describes an updated movement of the camera after the image sensor on the camera captures the second image and before the image sensor on the camera captures the third image. In some embodiments, the process includes detecting an updated pixel shift between the second image and the third image based on the fourth result vector. In some embodiments, the process includes determining that the third image includes a depiction of an object from the first image and the second image based on the updated movement of the camera and the updated pixel shift.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM) or Flash memory, a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A processor-implemented method comprising:

training a first convolutional neural network (CNN) using a plurality of training images; generating, upon determining that the first CNN has been trained, a first trained CNN and a second trained CNN, wherein the first trained CNN and the second trained CNN are based on the first CNN;

adding an interface layer to the second trained CNN;

processing a first image in a sequence of successive images using the first trained CNN to generate a first result vector, wherein the first image receives a full-image analysis; processing a second image that is subsequent to the first image in the sequence of images using the first trained CNN to generate a second result vector;

processing the second image using the second trained CNN and sensor data input to the interface layer to generate a third result vector, wherein the sensor data is collected after the first image is captured and prior to a capture of the second image, wherein the processing of the second image using the second trained CNN includes modifying the sensor data using a compensation value, and wherein, based on the modified sensor data, a cached first result vector from the first trained CNN is reused to label objects in subsequent images from the sequence of successive images based on sensor-detected movement and pixel shift;

comparing the third result vector to the second result vector to generate an error value;

calculating a modified compensation value using the error value via a backpropagation algorithm to reduce the error value;

generating a sensor-compensated trained CNN based on the second trained CNN with the modified compensation value, wherein a sensor interface layer of the sensor-compensated trained CNN is updated with the modified compensation value and sensor data input to the interface layer of the sensor-compensated trained CNN is modified using the modified compensation value; and processing a third image using the sensor-compensated trained CNN and determining the third image comprises one or more objects depicted in the first image and the second image, tracked using the sensor data and pixel shift.

2. The method of claim 1, wherein the first image is captured by an image sensor on a camera.

3. The method of claim 2, further comprising generating the sensor data by a movement sensor on the camera, wherein the sensor data describes a movement of the camera after the image sensor on the camera captures the first image and before the image sensor on the camera captures a second image.

4. The method of claim 3, wherein the movement sensor is selected from a group comprising an accelerometer, a magnetometer, a gyroscope, a global positioning system, and a proximity sensor.

5. The method of claim 3, wherein the first image includes a depiction of an object, the method further comprising generating a label for the object.

6. The method of claim 5, further comprising displaying the first image and the label on a display.

7. The method of claim 5, further comprising detecting a pixel shift between the first image and the second image.

8. The method of claim 7, further comprising determining that the second image includes the depiction of the object from the first image based on the movement of the camera and the pixel shift.

9. The method of claim 8, further comprising labeling the object with the label on the second image.

10. The method of claim 9, further comprising:

caching the first result vector output from the first trained CNN; and utilizing the cached first result vector output from the first trained CNN to label the object in the second image based on the movement of the camera and the pixel shift.

11. The method of claim 2, further comprising processing the third image that is subsequent to the second image in the sequence of images using the sensor-compensated trained CNN and updated sensor data input to the interface layer to generate a fourth result vector.

12. The method of claim 11, further comprising generating the updated sensor data by a movement sensor on the camera, wherein the updated sensor data describes an updated movement of the camera after the image sensor on the camera captures the second image and before the image sensor on the camera captures the third image.

13. The method of claim 12, further comprising detecting an updated pixel shift between the second image and the third image based on the fourth result vector.

14. The method of claim 13, further comprising determining that the third image includes a depiction of an object from the first image and the second image based on the updated movement of the camera and the updated pixel shift.

15. A computer program product comprising one or more computer readable storage media, and program instructions collectively stored on the one or more computer readable storage media, the program instructions executable by a processor to cause the processor to perform operations comprising:

training a first convolutional neural network (CNN) using a plurality of training images; generating, upon determining that the first CNN has been trained, a first trained CNN and a second trained CNN, wherein the first trained CNN and the second trained CNN are based on the first CNN;

adding an interface layer to the second trained CNN;

processing a first image in a sequence of successive images using the first trained CNN to generate a first result vector, wherein the first image receives a full-image analysis; processing a second image that is subsequent to the first image in the sequence of images using the first trained CNN to generate a second result vector;

processing the second image using the second trained CNN and sensor data input to the interface layer to generate a third result vector, wherein the sensor data is collected after the first image is captured and prior to a capture of the second image, wherein the processing of the second image using the second trained CNN includes modifying the sensor data using a compensation value, and wherein, based on the modified sensor data, a cached first result vector from the first trained CNN is reused to label objects in subsequent images from the sequence of successive images based on sensor-detected movement and pixel shift;

comparing the third result vector to the second result vector to generate an error value;

calculating a modified compensation value using the error value via a backpropagation algorithm to reduce the error value;

generating a sensor-compensated trained CNN based on the second trained CNN with the modified compensation value, wherein a sensor interface layer of the sensor-compensated trained CNN is updated with the modified compensation value and sensor data input to the interface layer of the sensor-compensated trained CNN is modified using the modified compensation value; and processing a third image using the sensor-compensated trained CNN and determining the third image comprises one or more objects depicted in the first image and the second image, tracked using the sensor data and pixel shift.

16. The computer program product of claim 15, wherein the stored program instructions are stored in a computer readable storage device in a data processing system, and wherein the stored program instructions are transferred over a network from a remote data processing system.

17. The computer program product of claim 15, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

18. A computer system comprising a processor and one or more computer readable storage media, and program instructions collectively stored on the one or more computer readable storage media, the program instructions executable by the processor to cause the processor to perform operations comprising:

training a first convolutional neural network (CNN) using a plurality of training images; generating, upon determining that the first CNN has been trained, a first trained CNN and a second trained CNN, wherein the first trained CNN and the second trained CNN are based on the first CNN;

adding an interface layer to the second trained CNN;

processing a first image in a sequence of successive images using the first trained CNN to generate a first result vector, wherein the first image receives a full-image analysis; processing a second image that is subsequent to the first image in the sequence of images using the first trained CNN to generate a second result vector;

processing the second image using the second trained CNN and sensor data input to the interface layer to generate a third result vector, wherein the sensor data is collected after the first image is captured and prior to a capture of the second image, wherein the processing of the second image using the second trained CNN includes modifying the sensor data using a compensation value, and wherein, based on the modified sensor data, a cached first result vector from the first trained CNN is reused to label objects in subsequent images from the sequence of successive images based on sensor-detected movement and pixel shift;

comparing the third result vector to the second result vector to generate an error value;

calculating a modified compensation value using the error value via a backpropagation algorithm to reduce the error value;

generating a sensor-compensated trained CNN based on the second trained CNN with the modified compensation value, wherein a sensor interface layer of the sensor-compensated trained CNN is updated with the modified compensation value and sensor data input to the interface layer of the sensor-compensated trained CNN is modified using the modified compensation value; and processing a third image using the sensor-compensated trained CNN and determining the third image comprises one or more objects depicted in the first image and the second image, tracked using the sensor data and pixel shift.

\* \* \* \* \*